US008139378B2

(12) United States Patent
Zou

(10) Patent No.: US 8,139,378 B2
(45) Date of Patent: Mar. 20, 2012

(54) LED DIMMER DEVICE ADAPTED FOR USE IN DIMMER

(75) Inventor: Dezhi Zou, Shenzhen (CN)

(73) Assignee: Civilight Shenzhen Semiconductor Lighting Co. Ltd., Shenzhen (CN)

( * ) Notice: Subject to any disclaimer, the term of this patent is extended or adjusted under 35 U.S.C. 154(b) by 464 days.

(21) Appl. No.: 12/435,204

(22) Filed: May 4, 2009

(65) Prior Publication Data

US 2010/0277103 A1 Nov. 4, 2010

(51) Int. Cl.

| | |
|---|---|
| ***G05F 1/00*** | (2006.01) |
| ***H05B 37/02*** | (2006.01) |
| ***H05B 39/04*** | (2006.01) |
| ***H05B 41/36*** | (2006.01) |
| ***H05B 41/16*** | (2006.01) |
| ***H05B 41/24*** | (2006.01) |
| ***H02M 7/00*** | (2006.01) |

(52) U.S. Cl. .......................... 363/13; 315/291; 315/246

(58) Field of Classification Search .................. 315/207, 315/224, 307-311, 291-297, 312-326, 274-276
See application file for complete search history.

(56) References Cited

U.S. PATENT DOCUMENTS

2010/0026208 A1* 2/2010 Shteynberg et al. .......... 315/297

* cited by examiner

*Primary Examiner* — Jacob Y Choi
*Assistant Examiner* — Henry Luong
(74) *Attorney, Agent, or Firm* — Morris Manning & Martin LLP; Tim Tingkang Xia, Esq.

(57) ABSTRACT

A LED dimmer device for use in dimmer is provided. The LED dimmer device includes rectifier, voltage boost device, pre-voltage detection circuit and after-voltage detection circuit adapted for detect voltage, master chip adapted for driving circuit and elements to work, elementary transformer and secondary transformer adapter for changing voltage, secondary rectifier adapted for rectifying and secondary filter capacitance circuit adapter for filtering, and secondary switch tube. The rectifier is adapted for transforming alternating current into direct current. The voltage boost device includes a metal oxide semiconductor field effect transistor used to make dimmer entering into a normal edge state. The master chip includes integrated comparing element used to compare voltage. The secondary switch tube is used to driving elementary transformer and secondary transformer, secondary rectifier, secondary filter capacitance circuit so as to drive LED power supply to illuminate.

4 Claims, 6 Drawing Sheets

LED DIMMER DEVICE ADAPTED FOR USE IN DIMMER

FIELD OF THE INVENTION

The present invention relates to a dimmer device, and more particularly pertains to a LED dimmer device adapted for use in dimmer.

BACKGROUND OF THE INVENTION

Si-controlled dimmer and electro-transistor dimmer (for short dimmer) can adjust brightness of tungsten lamp. Referring to FIG. 1, on-time of dimmer 5 is determined by charging time of capacitance 9 of circuit, and therefore change conduction angle of sinusoidal alternating current non-sinusoidal waveforms, and thus change current of the tungsten lamp 10 so as to adjust brightness, which is defined as leading edge technology. As indicated in FIG. 1, dimmer 5 is connected with tungsten lamp 10 in series. Current passes through fuse 1, inductance 2, Potentiometer 7, resistance 8, capacitance 9, and tungsten lamp 10 to form a charging loop of charging capacitance 9. The charging time of the capacitance 9 is determined by resistance of the potentiometer 7. When charging of the capacitance 9 is finished after a predetermined time, the capacitance 9 triggers control end of the dimmer 5 via trigger diode 6 to make dimmer 5 conductive. Because the tungsten lamp 10 is resistance load, a voltage waveform 1 is consistent with current waveform 3 (referring to FIG. 2) after edge of dimmer, and the on-time is same as off-time. Therefore, the adjusting of brightness of the tungsten lamp 10 is achieved.

LED is energy-saving and new lamp. The power of LED is much smaller than tungsten lamp. LED is a low-voltage direct current element. LED lamp need to be equipped with a LED driving power supply so as to be drived to illuminate. LED driving-switch power supply is capacitive load and is not equipped with dimmer control circuit. When the tungsten lamp 10 is replaced by LED lamp with switch power supply, the on-time of the dimmer 5 is shorter than that of voltage (referring to FIG. 3). When there is no current passing through the dimmer 5, there is voltage existed between the resistance 7 and the capacitance 9. This voltage charges for the capacitance 9. When charging for a predetermined time, the dimmer 5 is triggered, the dimmer 5 is in on-time twice in a half-period. LED lamp flashes frequently because of intermittence of input of driving-switch power supply. Therefore, the dimmer cannot adjust brightness of LED lamp with Internal/External Auto-switch Therefore, a dimmer device adapted for use in dimmer is desired to overcome the above-described shortcomings.

SUMMARY OF THE INVENTION

It is therefore an object of the present invention to provide a dimmer device adapted for use in dimmer.

In one aspect, to achieve the object of the present invention, a LED dimmer device for use in dimmer is provided. The LED dimmer device includes rectifier, voltage boost device, pre-voltage detection circuit and after-voltage detection circuit adapted for detect voltage, master chip adapted for driving circuit and elements to work, elementary transformer and secondary transformer adapter for changing voltage, secondary rectifier adapted for rectifying and secondary filter capacitance circuit adapter for filtering, and secondary switch tube. The rectifier is adapted for transforming alternating current into direct current. The voltage boost device includes a metal oxide semiconductor field effect transistor used to make dimmer entering into a normal edge state. The master chip includes integrated comparing element used to compare voltage. The secondary switch tube is used to driving elementary transformer and secondary transformer, secondary rectifier, secondary filter capacitance circuit so as to drive LED power supply to illuminate.

In a further embodiment, the voltage booster device is adapted for enabling on-time current and on-time voltage of dimmer being in same phase mode, and having a relative lower peak value of current.

In a further embodiment, when the alternating current rectified, voltage of the pre-voltage detection circuit and the after voltage detection circuit are simultaneously inputted an integrated comparing element of the master chip, which control frequency and duty-cycle of the voltage boost device to insure that difference between the step-up voltage and voltage elementary rectified is maintained at 30 volt.

In a further embodiment, when dimmer is rotated, the voltage of the pre-voltage detection circuit change correspondingly, which acts as standard voltage to control brightness changing and be inputted to the master chip to control frequency and duty-cycle of secondary switch tube, then the elementary and secondary transformer, secondary rectifier and secondary filter circuit are drived so as to drive LED power supply to illuminate.

the dimmer is any one of Si-controlled dimmer and electro-transistor dimmer. The number of the LED power supply is one or more, and the LED power supply is single color or multi-color.

In a further embodiment, the number of the LED power supply is one or more, and the LED power supply is single color or multi-color.

According to the present invention, Si-controlled dimmer and electro-transistor dimmer may adjust brightness of LED power supply such that environment friendly LED power supply is more widely applied. The dimmer device has good the brightness adjusting efficiency.

BRIEF DESCRIPTION OF THE DRAWINGS

The components in the drawings are not necessarily drawn to scale, the emphasis instead being placed upon illustrating the principles of the present disclosure. Moreover, in the drawings, like reference numerals designate corresponding parts throughout several views, and all the views are schematic.

DETAILED DESCRIPTION OF THE INVENTION

The dimmer device adapted for use in dimmer will be described in detail with the following figures and embodiments. It is understood that the following detailed embodiments are used to explain the present invention, and not limited the present invention.

Figure 1:
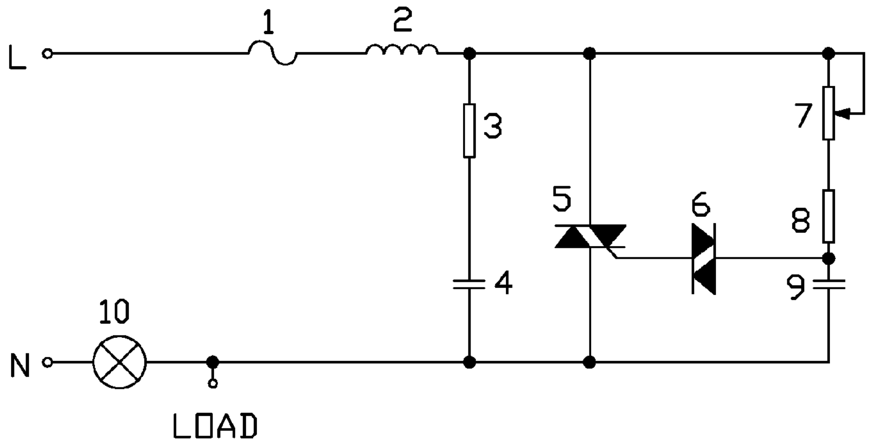
FIG. 1 is a conventional circuit principle view of Si-controlled dimmer adjusting brightness of tungsten lamp.
Figure 2:
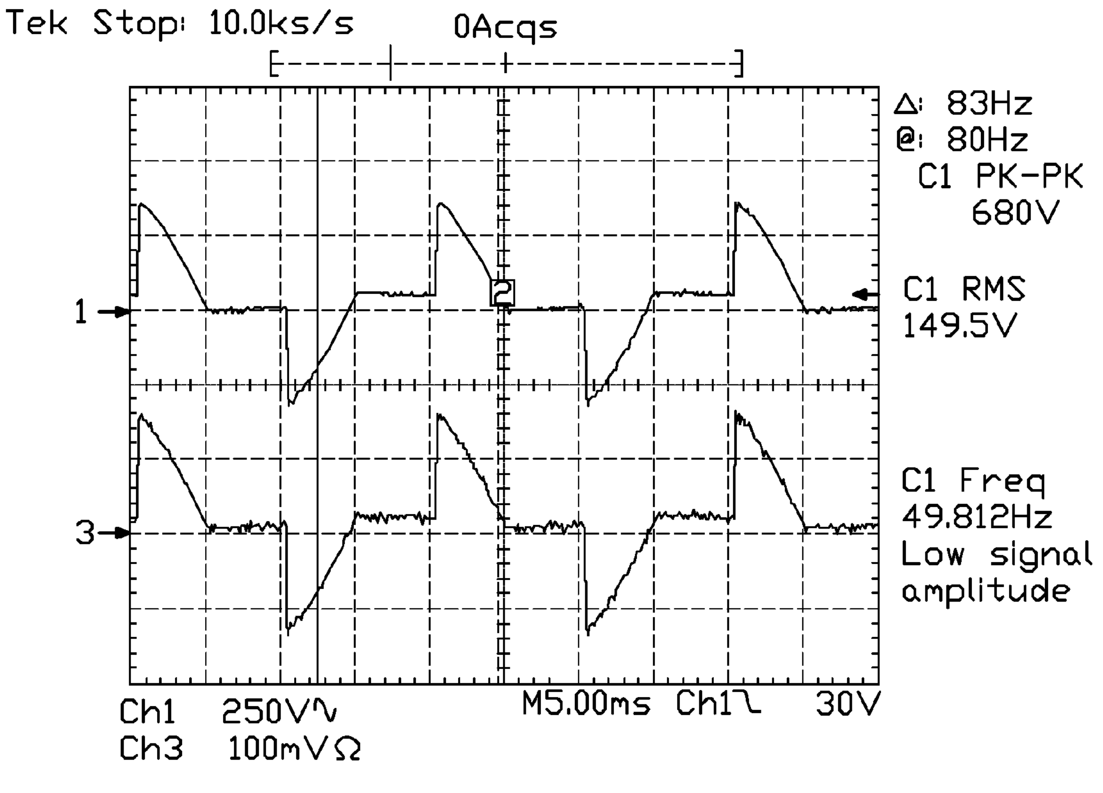
FIG. 2 is a schematic view of voltage waveform and current waveform when Si-controlled dimmer being edged in adjusting brightness of tungsten lamp, in which 1 designates input alternating voltage waveform, 3 designates input alternating current waveform.
Figure 3:
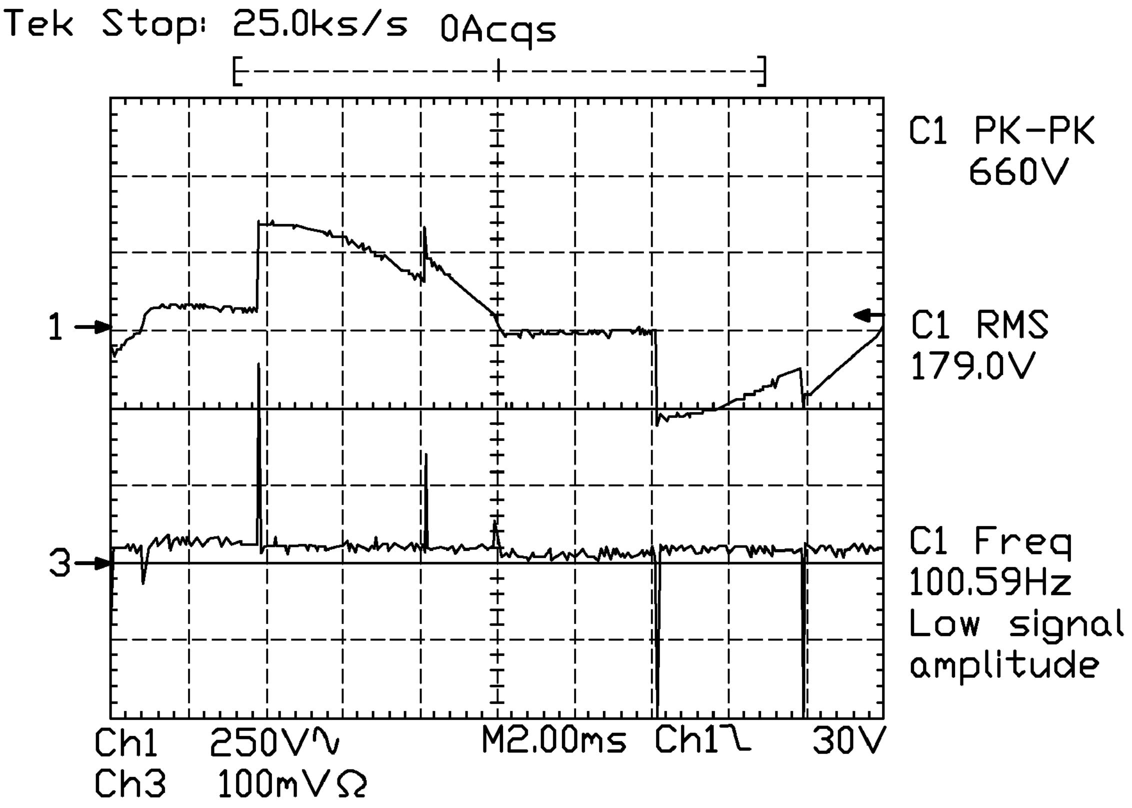
FIG. 3 is a schematic view of voltage waveform and current waveform when the tungsten lamp in FIG. 1 is replaced by LED lamp, in which 1 designates input alternating voltage, 3 designates input alternating current.
Figure 4:
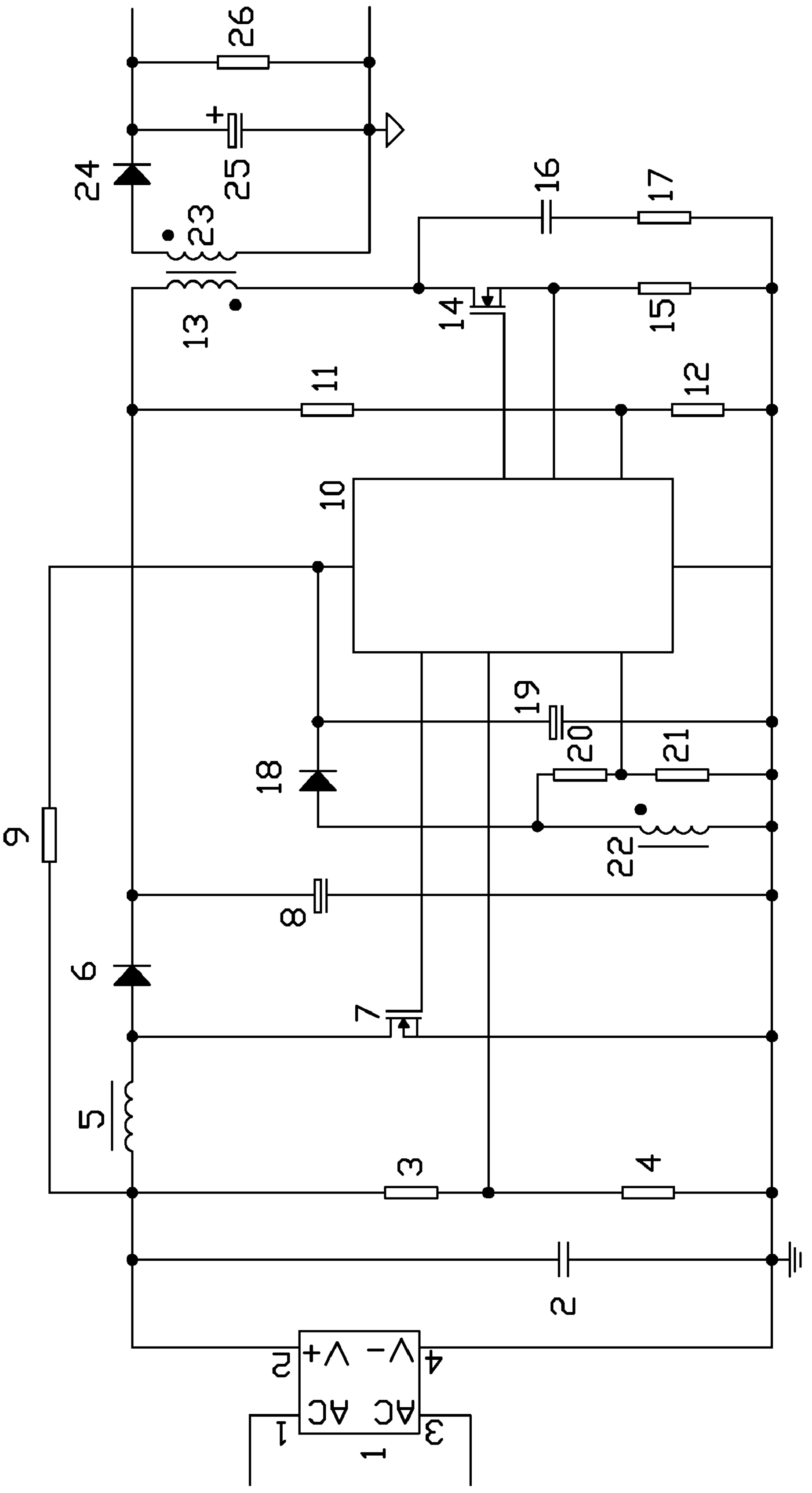
FIG. 4 is a circuit principle view of according to a embodiment according to the present invention.
Figure 5:
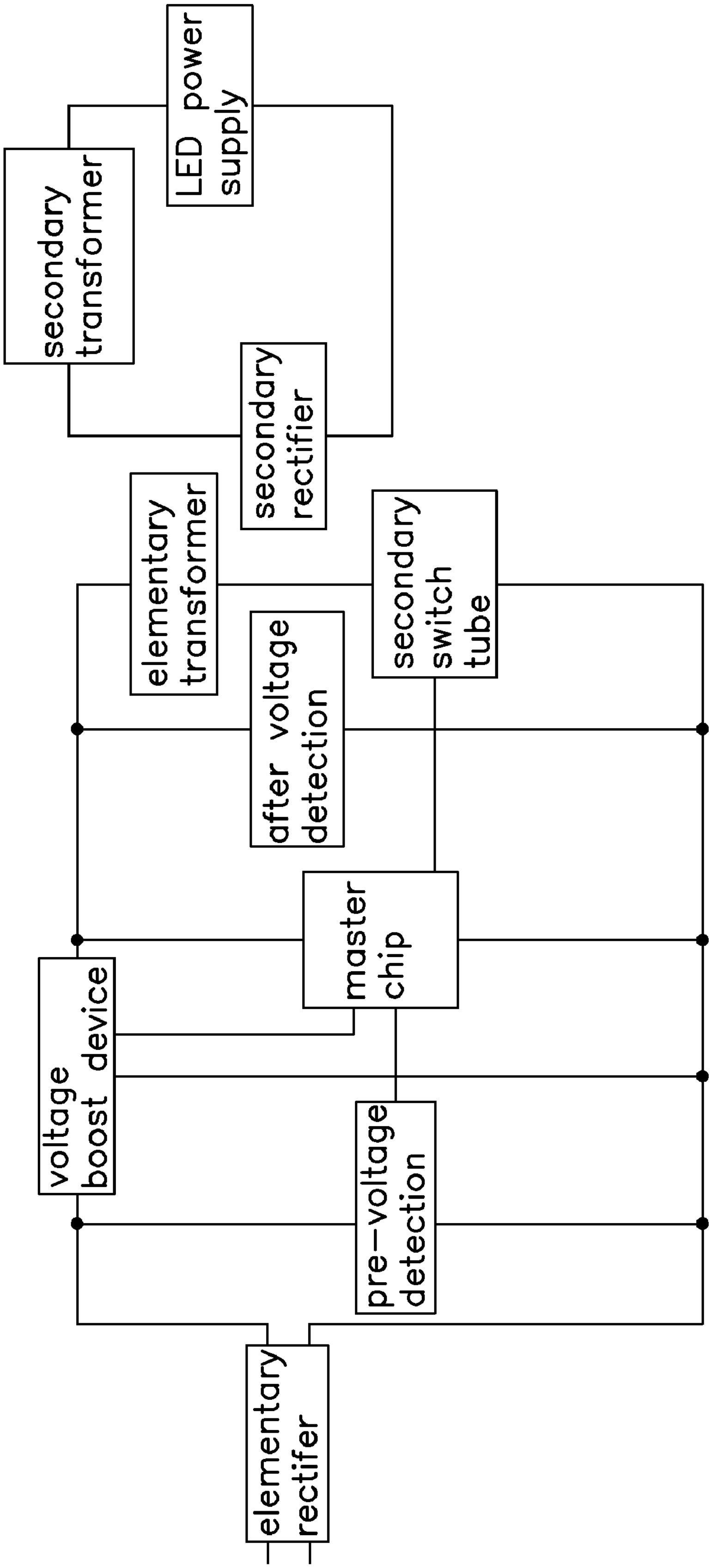
FIG. 5 is a flow-chart of a dimmer device adapted for use in dimmer according a embodiment according to the present invention.

Referring to FIG. 4 and FIG. 5, after edge of dimmer, mains supply voltage is transformed into direct-current voltage via primary rectifier 1 and filter capacitance 2. The start-up resistance 9 firstly charges the master chip 10 so as to drive voltage boost device 5, 6, 7 to work. The voltage respectively detected by pre-voltage detection circuit 3, 4 and after-voltage detection circuit 11, 12 are simultaneously inputted integrated comparison in the master chip 10 to compare, and then duty-cycle of metal oxide semiconductor field effect transistor (MOSFET) 7 of the step-up is adjusted to ensure that the voltage of step-up filter capacitance 8 is higher 30 volt-ampere than that of the filter capacitance 2. In addition, the peak value current of the adapter is relative low and has the same on-time as the voltage waveform. Furthermore, the power factor can be over 0.8. When the adapter is turn off switch tubes of step-up circuit is always in high frequency switch working state. The charge path of trigger circuit of the adapter is maintained, the adapter can be triggered again and works edge normally, which can be seen in waveform shown in FIG. 6 and FIG. 7.

The secondary switch tube 14 is drived by the master chip 10 to work. When the controlling angle of the knob adapter and the pre-voltage detection circuit 3,4 can detect change of voltage, which is also detection voltage of adapting information, and which is inputted the mater chip 10. Changing the duty-cycle of the secondary switch tube 14 adapts elementary charging current of the transformer. When the secondary switch tube 14 is turned off, energy of transformer obtained by charging discharges to secondary transformer 23. After acted by the secondary rectifier 24 and the secondary filter capacitance 25, the LED is drived to illuminate. Therefore, the brightness and driving current of the LED is controlled by the adapter such that the Si-controlled dimmer and electro-transistor dimmer can adjust the LED light source.

Figure 6:
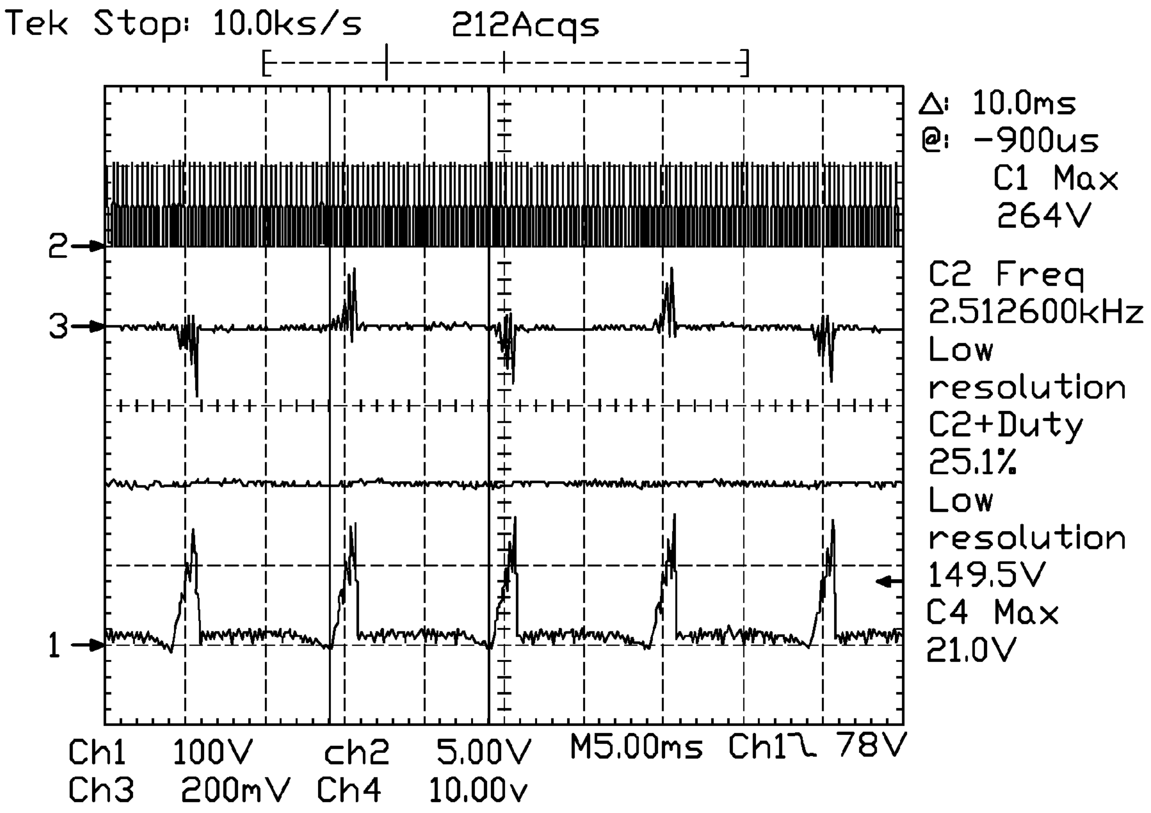
FIG. 6 is a schematic view of voltage and current waveform of a dimmer device adapted for use in dimmer according to a preferred embodiment according to the present invention.

Referring to FIG. 6, which shows a schematic view of voltage and current waveform of a dimmer device adapted for use in dimmer according to a preferred embodiment according to the present invention. In FIG. 6, 1 indicates waveform rectified by electro-transistor dimmer, and the Si-controlled is adjusted to a lowest controlling angle, and the voltage thereof is 164 VDC. 2 indicates voltage waveform of the capacitance after step-up, and maximum of voltage is 210 VDC. 3 indicates alternating current waveform, in which current and voltage are in same mode and in same on-time. Maximum of current is 360 MA. 4 indicates driving waveform of MOSFET, of which frequency is 63 KHZ, and of which duty-cycle is 32%.

Figure 7:
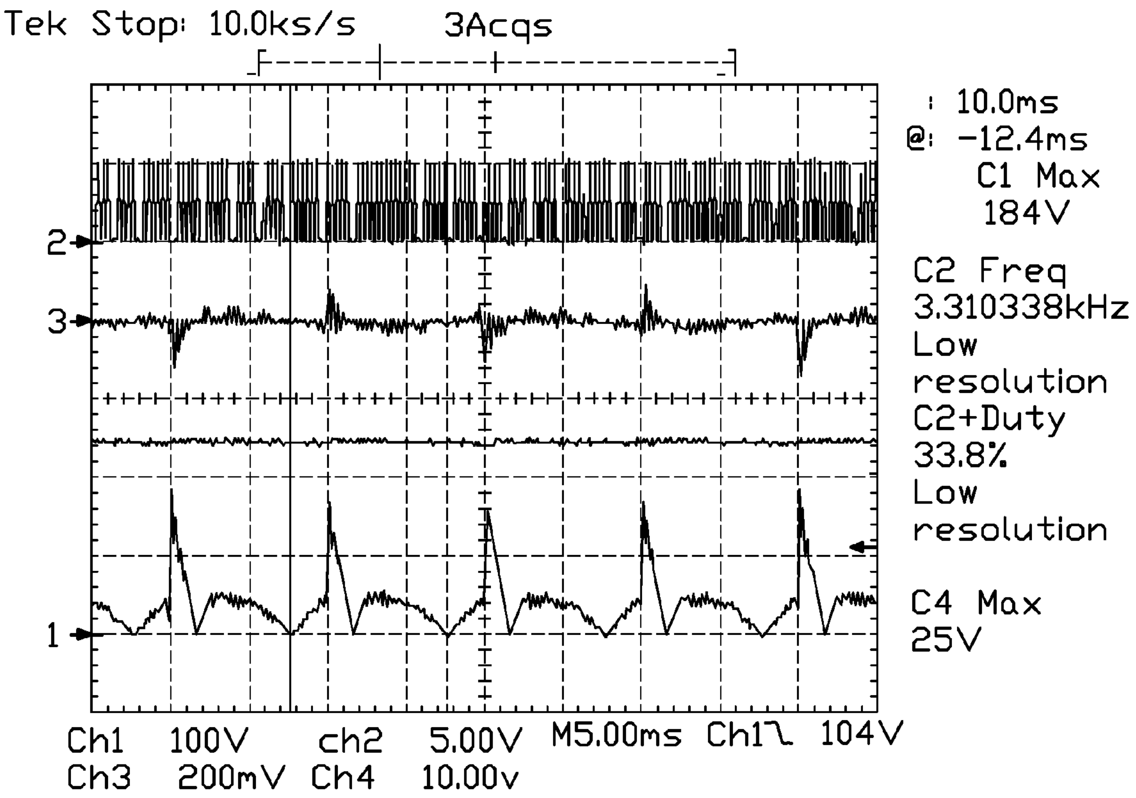
FIG. 7 is a schematic view of voltage and current waveform of a dimmer device adapted for use in dimmer according to a preferred embodiment according to the present invention.

Referring to FIG. 7, which shows a schematic view of voltage and current waveform of a dimmer device adapted for use in dimmer according to a preferred embodiment according to the present invention. In FIG. 6, 1 indicates waveform rectified by Si-controlled dimmer, and the Si-controlled is adjusted to a lowest controlling angle, and the voltage thereof is 184 VDC. 2 indicates voltage waveform of the capacitance after step-up, and maximum of voltage is 250 VDC. 3 indicates alternating current waveform, in which current and voltage are in same phase mode and in same on-time. Maximum of current is 300 mA. 4 indicates driving waveform of MOSFET, of which frequency is 63 KHZ, and of which duty-cycle is 25%.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A LED dimmer device for use in a dimmer, comprising:

a rectifier adapted for transforming alternating current into direct current;

a voltage boost device including a metal oxide semiconductor field effect transistor used to make the dimmer entering into a normal edge state;

a pre-voltage detection circuit and an after-voltage detection circuit adapted for detecting voltages;

a master chip adapted for driving the circuits and elements to work, the master chip including an integrated comparisor used to compare the voltages;

an elementary transformer and a secondary transformer adapter for changing the voltages;

a secondary rectifier adapted for rectifying and a secondary filter capacitance circuit adapter for filtering; and a secondary switch tube used for driving the elementary transformer and the secondary transformer, the secondary rectifier, and the secondary filter capacitance circuit so as to drive an LED power supply to illuminate;

wherein the voltage booster device is adapted for enabling on-time current and on-time voltage of the dimmer being in the same phase mode and having a relative lower peak value of current, and wherein when the alternating current is rectified, the voltages of the pre-voltage detection circuit and the after voltage detection circuit are simultaneously inputted into the integrated comparisor of the master chip, which control a frequency and a duty-cycle of the voltage boost device to insure that a difference between the step-up voltage and voltage elementary rectified is maintained at 30 volt.

2. The LED dimmer device according to claim 1, wherein when the dimmer is rotated, the voltage of the pre-voltage detection circuit changes correspondingly, which acts as a standard voltage to control brightness changing and be inputted to the master chip to control frequency and duty-cycle of the secondary switch tube, then the elementary and secondary transformers, the secondary rectifier and the secondary filter circuit are driven so as to drive the LED power supply to illuminate.

3. The LED dimmer device according to claim 1, wherein the dimmer is any one of a Si-controlled dimmer and an electro-transistor dimmer.

4. The LED dimmer device according to claim 1, wherein the number of the LED power supply is one or more, and the LED power supply is a single color or a multi-color.

* * * * *